United States Patent [19]

MacVane et al.

[11] 4,141,318
[45] Feb. 27, 1979

[54] FISH CULTURE TANK

[75] Inventors: Thomas S. MacVane; Jon M. Lindbergh, both of Bainbridge Island, Wash.; Barry A. Friedman, West Nyack, N.Y.

[73] Assignee: Union Carbide Corporation, New York, N.Y.

[21] Appl. No.: 756,853

[22] Filed: Jan. 5, 1977

[51] Int. Cl.² .............................................. A01K 63/00
[52] U.S. Cl. ........................................................ 119/3
[58] Field of Search .................................. 119/3, 2, 4, 5

[56] References Cited

U.S. PATENT DOCUMENTS

| | | | |
|---|---|---|---|
| 1,528,179 | 3/1925 | Baldridge | 119/3 |
| 3,116,712 | 1/1964 | Ogden et al. | 119/3 |
| 3,716,025 | 2/1973 | Lawson | 119/3 |
| 3,726,251 | 4/1973 | Fremont | 119/3 |
| 3,756,197 | 9/1973 | Buss et al. | 119/3 |
| 3,804,063 | 8/1974 | Finger | 119/3 |
| 3,870,018 | 3/1975 | Fruchtnicht | 119/3 |
| 3,888,210 | 6/1975 | Buss | 119/3 |
| 3,916,834 | 11/1975 | Buss | 119/3 |

Primary Examiner—Hugh R. Chamblee
Attorney, Agent, or Firm—Owen, Wickersham & Erickson

[57] ABSTRACT

A cylindrical fish culture tank adapted for a self-cleaning operation. Oxygenated water, whether fresh, recycled, or a mixture of fresh and recycled, enters a tangential inlet near the bottom of the tank and develops an upwardly flowing spiral action. The spiral action, assisted by swimming movements of fish, causes solids to gravitate towards the center of the tank. The bottom of the tank is shaped as an inverted obtuse cone with a screened, normally closed drain opening in the center. At the top of the tank is a screened overflow drain, from which water is normally withdrawn for discharge or for cleaning and filtering. About once a day, the fish culture tank may be cleaned by removing the solids through the screened drain. An airlift assembly may be connected to the drain for recovery of live fish when the screen is taken off the drain. At transfer or harvest time, the live fish may be drained from the bottom of the tank and recovered.

12 Claims, 9 Drawing Figures

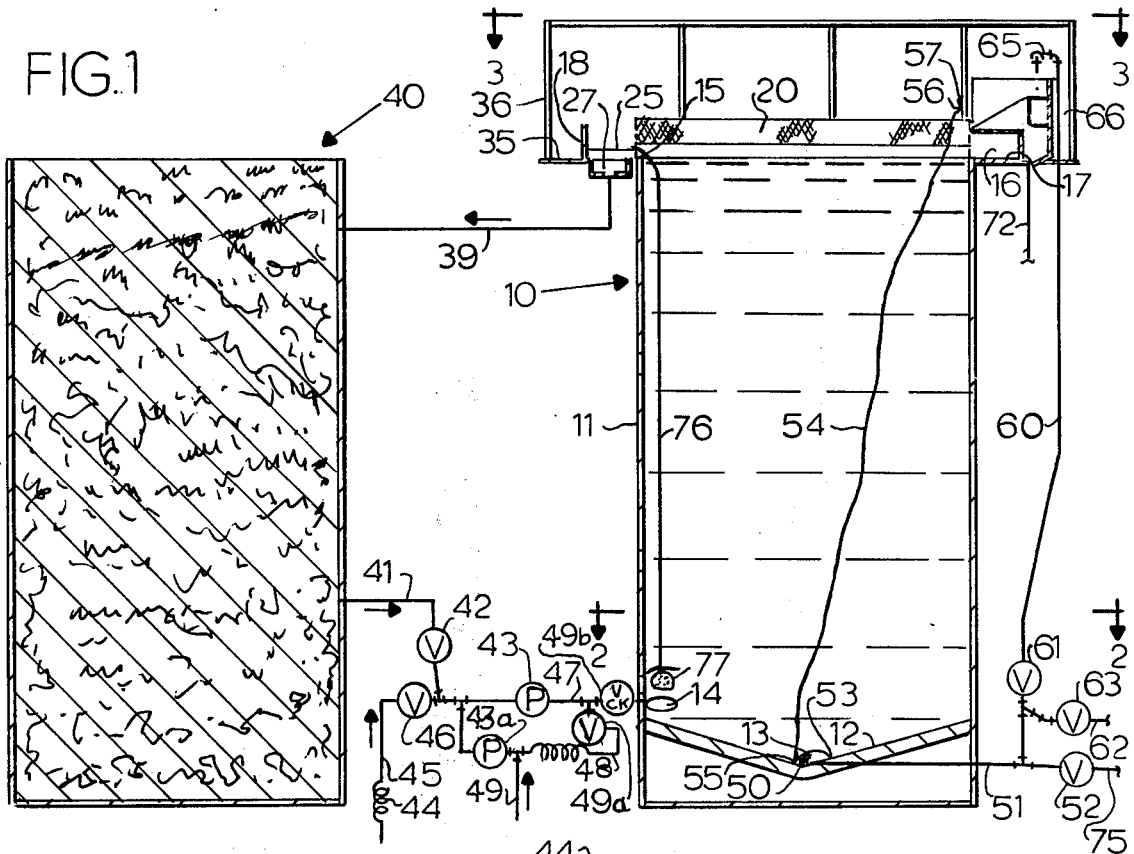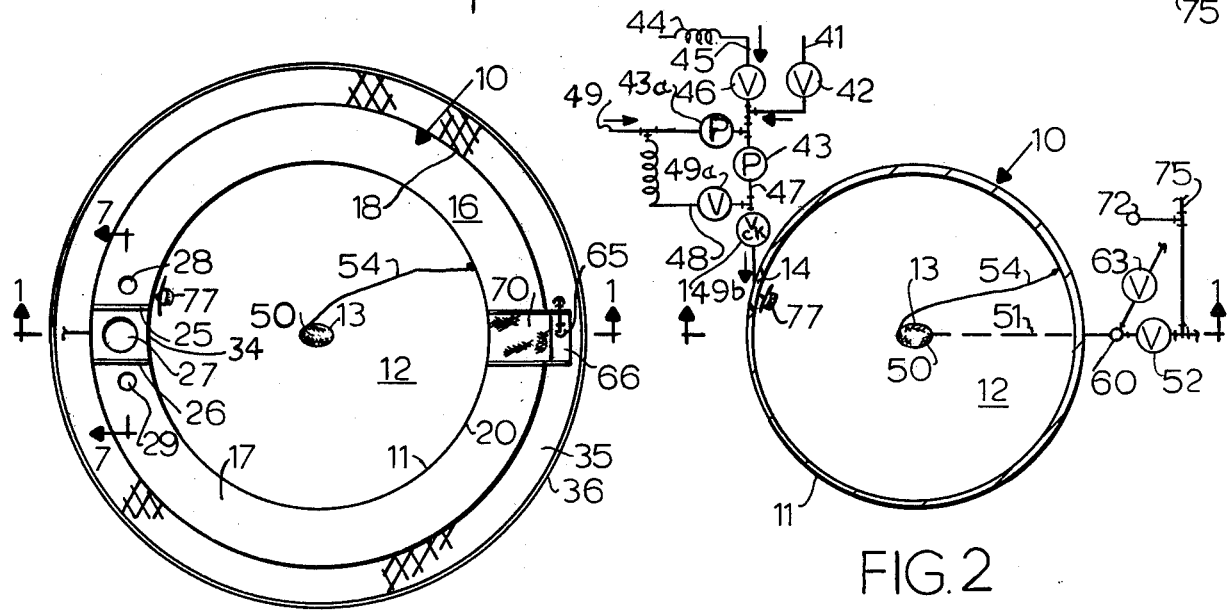

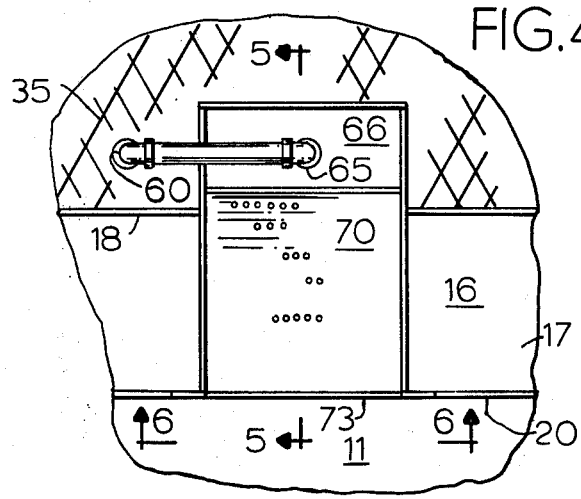
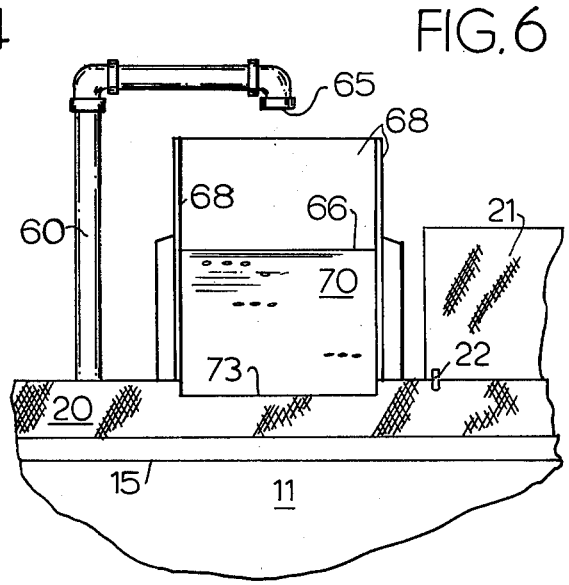
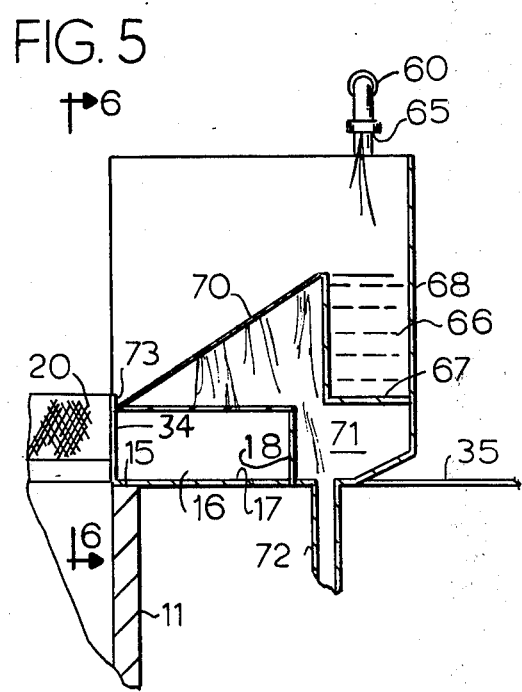
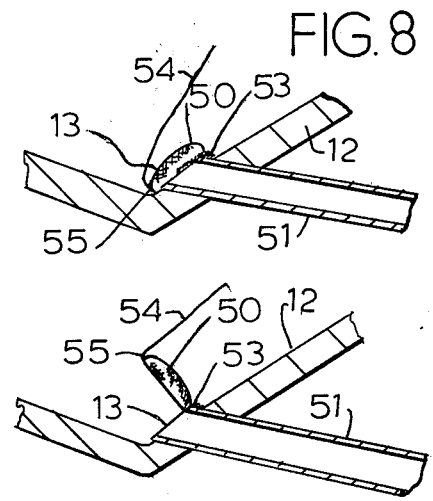
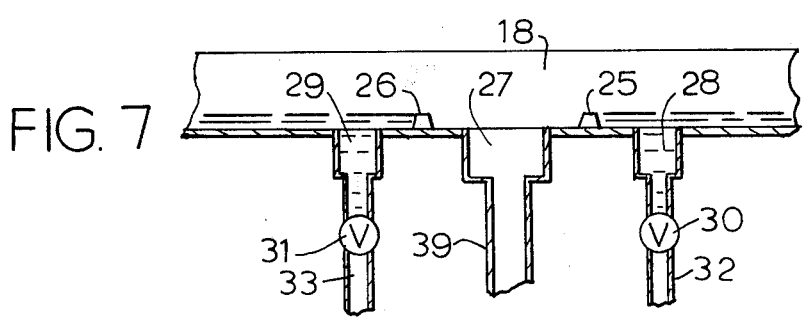

FISH CULTURE TANK

BACKGROUND OF THE INVENTION

This invention relates to fish culture tanks, and particularly to a type of fish culture tank which is, to a large extent, self-cleaning.

Culture tanks may be used to grow fish from a small hatchery stage up to a larger stage. For example, salmon may be grown to the smolting stage, or trout may be grown to harvest size. The use of culture tanks has several advantages over raceways, in that they take up much less space, simplify the problems of managing the quality of various factors related to the water, such as dissolved oxygen content, and make it feasible to recycle the water in order to conserve water, simplify water waste treatment, and also to take advantage of conserved heat.

One of the main costs in fish rearing, whether in tanks or in raceways, has been the large labor costs involved in keeping the tanks clean or in cleaning them from time to time. Generally speaking, culture tanks, especially these of the present invention, are more easily cleaned than are raceways, but they have still been expensive to keep clean.

A prior method for cleaning tall, cylindrical, fish culture tanks used intermittent bottom-to-top high-flow flushing. This practice had several disadvantages. First, carrying the particulate matter up a vertical cylindrical tank and into an overflow drain involved imparting upward velocities of at least one meter per minute, considering the particle sizes normally encountered in fish culture tanks. Second, forcing the solid particles upwards through masses of fish (which may be in the density of 16 to 160 kilograms per cubic meter) tended to result in the solid waste particles being trapped in the gills of the fish. Third, these strong flows, even if used only 45 minutes every 6 hours, as was typical, excited and stressed the fish, leading to some mortality and slowing their growth. Fourth, high-flow pumping, which was in the order of 10,000 liters per minute for normal sizes of fish culture tanks, was expensive both in the initial cost of the pump needed and also for the operational expense of the pumping, once installed.

Another prior method for cleaning tall, cylindrical, fish culture tanks used a permanently installed rotating vacuum system. The vacuum system utilized an axially-extending vertical pipe with a generally horizontal radial extension at the bottom going out to the wall of the tank. At the distal end of the radial extension was a vacuum head. An airlift or a pump supplied the vacuum force. During cleaning, the axial pipe or its horizontal extension was rotated, and wiper blades on the horizontal extension pushed solid waste towards the tank wall, where it was sucked up by the vacuum head. This method was complicated, involved expensive equipment, was expensive in operation, cluttered the internal space of the tanks, and set up both moving and stationary obstructions that sometimes injured the fish.

Various methods have been used for cleaning shallow cylindrical tanks, such as manual vacuuming and lowering the water level while developing a central vortex, but these methods were not practical once the depth of the culture water in the tank exceeded more than about 5 feet. Tanks embodying the present invention can readily be made to accommodate depths of twenty or thirty feet or more of water.

The present invention has as one of its objects the provision of a self-cleaning tank that can enable the same staff to handle at least three times as many tanks or to take one-third the time in handling the tank, and thereby reduce the labor costs of cleaning up to about 85%.

Another object of the invention is to provide a system for gently removing the solid waste, regardless of the tank depth.

Another object of the invention is to provide an improved tank which can safely accommodate more fish than it could otherwise and can be used in a recycle system to provide improved growing conditions.

Another object of the invention is to provide a self-cleaning fish culture tank in which it becomes easier to remove the solids and dead fish found in the system, while at the same time saving the live fish that happen to be entrapped within the removal lines.

SUMMARY OF THE INVENTION

The self-cleaning fish tank of this invention is a generally cylindrical tank with an inverted, preferably obtuse, conical bottom and a normally closed central drain opening. In the wall just above the outer periphery of the inverted conical bottom wall is a tangential inlet for the water, which may have previously been oxygenated and adjusted as to its temperature. The tangential intake sets up a rising spiral pattern of water flow, the maximum water velocity being at the periphery of the conical bottom. At the upper end of the tank, the cylindrical wall has an overflow drain, screened to prevent the escape of fish. Normal recirculation, when used, withdraws the water at this location and sends it to a filter vessel.

Once a day, or more often if desired, special cleaning is done by opening the central drain opening at the bottom or by developing suction there. At this time, solid waste which has accumulated near the inverted apex of the conical bottom is removed through the drain opening. A screen can be used to prevent the drain from carrying away the live fish. If necessary, the screen may be opened at times so as to enable transfer or removal of all fish from the tank or the cleaning out of any plugging at this point, as by dead fish.

In a preferred form of the invention the drain pipe includes an airlift valve which, when used, carries the water, accumulated solid waste, and unintentionally evacuated live fish up to a point at the top of the tank where the dead fish and the live fish can be separated, and the live fish can be recovered into the main culture tank.

Other objects and advantages of the invention will appear from the following description of a preferred form of the invention.

DESCRIPTION OF THE DRAWINGS

In the drawings:

FIG. 1 is a diagrammatic view in elevation and in section along the line 1—1 in FIGS. 2 and 3, of a fish culture tank embodying the principles of the invention, in combination with a filter tank and a recycling and water-oxygenation system.

FIG. 2 is a view in section taken along the line 2—2 in FIG. 1 showing the bottom portion of the tank.

FIG. 3 is a top plan view of the culture tank, taken along the line 3—3 in FIG. 1.

FIG. 4 is a fragmentary enlarged view in elevation of a portion of the upper end of the tank where the airlift conduit empties into a container.

FIG. 5 is a view in section taken along the line 5—5 in FIG. 4.

FIG. 6 is a view taken along the line 6—6 in FIG. 5.

FIG. 7 is a view in elevation and in section taken along the line 7—7 in FIG. 3.

FIG. 8 is a fragmentary enlarged view in section of the tank bottom, showing the drain opening with the screen in closed position.

FIG. 9 is a view similar to FIG. 8 with the screen lifted up.

DETAILED DESCRIPTION OF A PREFERRED EMBODIMENT

FIG. 1 shows a fish culture tank 10 embodying the principles of the invention. As shown in FIGS. 2 and 3, the culture tank 10 preferably has a cylindrical side wall 11, and as shown in FIG. 1 the bottom wall 12 of the liquid-filled volume of the tank 10 comprises an inverted, preferably obtuse, conical wall 12 having a drain opening 13 at its bottom center. The cone preferably has an included angle of about 150°, thus being inclined at about 15° with respect to the horizontal. The inlet means for water is preferably a single opening 14 through the cylindrical side wall 11, so located and structured that it imparts a tangential entry of water into the tank 10, and since the water enters in substantial amount, this tangential entry provides a circular helical or spiral rising action to the incoming water. It is particularly advantageous for the opening 14 (or openings 14, if there is more than one) to be close to the bottom of the wall 11, at or near the outer periphery of the conical bottom wall 12.

At the upper end of the tank 10, where the cylindrical wall 11 terminates in an upper edge 15, is a suitable overflow collection and removal means. This may comprise a circumferential annular collector ring 16 having a bottom wall 17 and a cylindrical wall 18 extending higher than the edge 15. Alternatively, the upper edge 15 of the tank 10 may have a portion lower than the remainder over a suitable sector or sectors, and the overflow may be collected only from such sector or sectors. To prevent fish from being swept out of the tank 10 over the edge 15 and into the collector ring 16, the upper edge 15 of the tank 10 may have thereabove, preferably welded thereto, a perforated fish guard or screen 20 (or a series of such screens or plates 20), shaped to act as an upper continuation of the wall 11, there enabling the passage of water but not fish therethrough. This perforated fish guard 20 may be vertical metal-mesh grating or sheet metal with punched holes and may be approximately 0.7 meter high, being high enough to prevent fish from leaping over it, while its perforations are small enough to bar the passage of fish while permitting feces and other solid wastes to pass. It may also be made of suitable screening material. As the fish grow and their jumping ability increases, it may be desirable to use a higher fish guard. For this purpose, the normal height of the fish guard 20 may be extended by a series of arcuate barrier panels 21, one of which is shown in FIG. 6. These may be metal or composition or other suitable material, perforated or imperforate, supported by clips 22 secured thereto to engage the fish guard 20.

Within the collector ring 16 or other discharge passage the heavier solids may be trapped by a pair of weirs 25,26 (See FIGS. 3 and 7), one being placed on each side of a central effluent discharge opening 27, into which the liquid overflow flows continuously. The solid wastes can then be discharged continually or at intervals through openings 28 and 29, which may be approximately 5 centimeters in diameter, located upstream, respectively, of each weir 25,26. Valves 30 and 31 are provided in respective waste drain pipes 32 and 33. The weirs 25,26, in addition to their filtering function, also help to determine the flow rate of the waters through the culture tank 10. The fish guard 20 preferably has an imperforate portion 34 (FIG. 3) in between the weirs 25 and 26, to protect the opening 27 from solids flowing thereinto. There may be a walkway 35 around the wall 18, with a guard rail 36, to enable maintenance, inspection, and work concerned with the upper portions of the tank 10 and the ring 16 and associated parts.

Generally, it is advantageous to purify and then recirculate the overflow water. Not only does this save water, but it also enables the conservation of heat and makes it economical to maintain the water in the tank 10 at a temperature above ambient, which is often desirable. For a system incorporating water recirculation, the discharge opening 27 is connected by a pipe 39 to a filter vessel 40, where the water withdrawn from the tank 10 is filtered and purified by either mechanical filtering alone or by also including a bio-filter arrangement. There may, of course, be a series of filtration and purification media or vessels. The filtered and purified water may be withdrawn near and somewhat above the bottom of (or, if desired, from the top or other suitable location) of the vessel 40 (or the final such vessel) through a pipe 41 and sent via a valve 42 to a mainstream pump 43 or to a sidestream pump 43a. Makeup water, which may be heated by a heater 44 to a suitable temperature to give the desired temperature to the mixture, comes from a pipe 45 via a valve 46 and may go to either or both of pumps 43 and 43a. Beyond the pump 43, most of the water flows through a main conduit 47, but constituting about 5 to 50% of the water is sent by the pump 43a into a sidestream 48; this sidestream water is used to obtain saturated oxygenation of that portion of the water in a long pipe filled by the water and under pressure, the oxygen being supplied under pressure from a suitable supply via a conduit 49 and pressure maintained by a valve 49a. Then the sidestream 48 may rejoin the main conduit 47, and the well-oxygenated mixture enters the tank 10 via the tangential inlet 14 after passing through a check valve 49b. If desired, the sidestream 48 may have its own check valve and may even enter a different tangential inlet.

If the bulk of the water is to be recirculated, it is quite important for a deep tank like this to employ oxygenated water rather than simply aerated water, and it is important that there be oxygen at or near as possible to the bottom of the tank. This is one important reason for locating the inlet opening 14 as near the tank bottom as can be done possibly. Further, by providing tangential entry, the oxygen level is maintained better throughout the tank 10, while entry that causes general turbulence tends to dissipate the oxygen into bubbles that rapidly rise to the surface. In general, the use of a single entry opening 14 located near the bottom of the tank 10 reduces unwanted turbulence while assuring good conditions throughout the tank 10 with smooth flow of water and excellent distribution of oxygen, with low losses from bubbling. In fact the distribution of oxygen is better than if it were introduced at a plurality of different heights, especially if sought to be introduced directly rather than, as here, by saturating with oxygen a portion of the water introduced at the inlet 14.

The strongly oxygenated water (the percentage of oxygen being readily adjustable, as by varying the proportion of water sent by the pump 43a through the sidestream 48) is thus caused to flow tangentially into the tank 10, so that the water and its entrained oxygen not only penetrate well into the lower levels but also rise smoothly toward the top 15, developing a spiral action. The water velocity is highest at the periphery of the conical bottom 12, near the wall 11, and diminishes toward the center of the tank and toward the upper portions of the tank 10.

The tangential entry of the water in a generally horizontal plane from the peripheral location imparts a spiral action which causes the particulate solids to gravitate toward the center of the culture tank 10, as they fall toward the bottom wall 12. The shallow cone shape of the bottom wall 12 helps to collect feces, food particles, other particulates, and dead fish, this structure thereby aiding this tendency of these particles to move toward the center near the drain opening 13, for the swirling water has its minimum velocity there. This gravitation of solids toward the bottom center is assisted by the swimming of the fish themselves near the bottom, for their movement helps to keep the solids from sticking to the sides of the cone 12. This means that the water at the apex of the cone has a minimum velocity for easy removal through the opening 13, via a screen 50 into a drain pipe 51, upon the opening of a valve 52, enabling flow by gravity through the pipe 51. In this manner, the fish culture tank 10 can be cleaned once a day or oftener. The tank 10 is thus largely self-cleaning, requiring for such daily cleaning only an opening of the valve 52 for a period long enough to withdraw the accumulated solids from the tank bottom.

The screen 50 prevents the small but healthy fish from being sucked through the drain opening 13 into the drain pipe 51. The screen 50 has a wide enough mesh to allow most sediment to be carried out and a fine enough mesh to prevent the fish from passing through. In normal action, the drain opening 13 can be kept open in this manner, with the smaller particles being withdrawn through the screen 50.

If and when the screen 50 becomes plugged, as by dead fish, it can be opened. For example, the screen 50 may be supported by a hinge 53, and a rope or cable 54 may be secured to the screen 50 at a point 55 diametrically opposite the hinge 53. One end 56 of the rope or cable 54 is normally secured to a suitable anchoring device 57 at the top of the tank 10, where an operator can stand on the walkway 35 and pull up on it to lift the screen 50 about its hinge 53, as shown in FIGS. 8 and 9 as well as in FIG. 1. With the temporary lifting of the screen 50, one possible way of disposing of the accumulated dead fish and other large area debris is to pass them down into the drain pipe 51 and remove them through that.

However, a presently preferred embodiment of the invention takes into account the fact that at this time it is possible that some live fish may enter the drain pipe 51 during the removal of the solids and dead fish. The present invention makes it possible to rescue the live fish by an airlift system. In the airlift system a vertical pipe 60 is provided with a valve 61 and an air conduit 62 having a valve 63 is connected to the pipe 60 at or just below the valve 61. The pipe 60 may be approximately ten centimeters in diameter, with the airline 62 entering it at about one-eighth of its height. Air is pumped at a sufficient pressure to lift all the liquid and both live and dead fish contained therein, with the sediment-laden water and to carry it up to an outlet spout 65 where it falls into a collection box 66. The collection box 66 has a solid bottom 67 and solid side walls 68, and it is located adjacent to a sloping perforated screen 70, so that the water overflows the box 66 onto the screen 70 and falls through it into a chamber 71, from whence it is removed by a pipe 72. The lower end of the screen 70 has a short retaining lip 73. The live fish readily flop themselves back from the box 66, over the screen 70 and into the water of the main tank 10. The dead fish and large particles of solid debris either remain in the box 66 or are caught by the screen 70, and the retaining lip 73, and manually removed therefrom for disposal.

The airlift and screen-raising collection system may typically be operated about once per day, but if there are many dead fish or much solid accumulation, there may have to be two or more cleanings a day. The airlift system is preferred, especially for small fingerlings less than 50 grams. Usually this cleaning operation requires no more than fifteen minutes per culture tank per day.

Another feasible configuration of an airlift solid waste evacuation system would be to have a portable airlift pipe inside the culture tank with the suction end in close proximity to the apex of the conical bottom. All solid waste and dead fish would then be evacuated up through this portable airlift, which could be temporarily removed when it interfered with fish-culture activities within the tank. The drain 51 would then only be opened to evacuate fish for transfer or harvest.

When the fish in the tank 10 have been grown up to a desired size (whether for transfer to a different location or for harvest and sale), the drain opening 13 is preferably used to remove the live fish. The screen 50 is lifted out of the way, the valve 52 is opened, and the incoming water supply is reduced or cut off, as at the pump 43. The water in the tank 10 then flows through the opening 13 and the drain pipe 51 into an outlet conduit 75, which may be quite long, emptying where desired. The water carries the live fish with it through the conduit 75. By reducing the inlet flow instead of cutting it off completely when the fish are to be emptied from the tank 10, the gentle swirling action resulting from this partial flow in through the tangential inlet 14 forces the fish gently through the drain 13 with minimum stress and inconvenience.

If desired, the screen 70 may be left in place until about one-third to one-half of the water is drained out before opening the screen 70 and removing the fish. We have found this procedure helpful in reducing the discharge pressure and thereby preventing injuries to the fish.

At this time, since it may take a significant amount of time to drain the tank 10, and since less or no oxygenated water is then being introduced into the tank via the inlet 14, it may also be desirable to supply some oxygen directly to the tank 10, near its bottom 12. For example, one or more (preferably more) oxygen conduits 76 may be inserted from the top of the tank as shown in FIG. 1 and oxygen supplied therefrom through a diffuser 77 at the lower end. The diffuser 77 may have a finepore outlet and may be ceramic, carbon, or stainless steel sintered to shape. The conduits 76 and diffusers 77 may also be used to minimize the deleterious effects of low oxygen levels in the water during equipment repair, electrical failure, and other occasions.

In some installations, it may be economical to operate without recirculation and without oxygenation of the water. For example, water may be plentiful and the waste water may be used to irrigate crops, having value as fertilizer as well as for its water. As another example, if the tank is used with a relatively low density of fish, oxygenation may not be required when only fresh stream water is used. Oxygenation becomes important when the water is to be recirculated and also when the fish are reared at relatively high density.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A fish culture tank having self-cleaning properties, including in combination:
   a tank having a cylindrical side wall,
   an inverted conical bottom wall with a normally closed central drain opening therethrough,
   overflow collection and removal means at the upper end of the cylindrical wall,
   a drain conduit leading away from said drain opening,
   tangential inlet means through said cylindrical wall close to the outer periphery of the inverted conical bottom wall, whence water inflow sends up a rising helical flow,
   airlift means connected to the drain conduit for carrying the liquid and solids from said drain opening up above the upper end of the tank,
   a closed receiving container into which the airlift means empties,
   a sloping mesh slide inclined from the upper end of said receiving container down to the upper edge of said tank, for passing through the liquid and catching large solids and for enabling live fish to reenter the tank, and
   a drain conduit beneath said sloping mesh slide.

2. A fish culture tank having self-cleaning properties, including in combination:
   an interiorly unobstructed deep tank having a cylindrical side wall having a height greater than its diameter and containing an unobstructed volume,
   an inverted conical bottom wall with a normally closed central drain opening therethrough,
   overflow collection and removal means at the periphery of the upper end of the cylindrical wall,
   a drain conduit leading away from said drain opening,
   means for opening said normally closed drain opening to permit passage therefrom with said drain conduit,
   tangential inlet means near the bottom of said tank through said cylindrical wall close to the outer periphery of the inverted conical bottom wall, whence water inflow sends up a rising helical flow and sets up a central vortex action, and
   water oxygenation means outside said tank for supplying said inlet means with water containing substantially pure, substantially nitrogen-free oxygen, thereby oxygenating the deep tank with the rising helical flow while the water helps to carry heavy waste down toward the central drain opening,
   said overflow collection and removal means comprising
   an arcuate collector having a bottom wall lying below the upper end of said side wall, a vertical wall on the outer edge of said bottom wall, and a screening fish guard supported on the upper end of said side wall to exclude the passage of fish and to enable the passage of overflow water into said collector,
   a main outlet opening in the bottom wall of said collector,
   weir means near said outlet opening, separating it from most of said collector and reducing the flow of heavy solids into said outlet opening, and
   solids drainage means on the opposite side of said weir means from said main outlet opening.

3. A fish culture tank having self-cleaning properties, including in combination:
   a tank having an imperforate cylindrical side wall with a height greater than its diameter and an upper edge,
   an inverted obtusely conical, smooth bottom wall with a screened central drain opening therethrough, said tank being interiorly unobstructed,
   a drain conduit leading out from said drain opening,
   valve means for opening and closing said drain conduit,
   an overflow collection receptacle at the periphery of the upper end of the cylindrical wall, having a generally imperforate bottom wall and an imperforate outer wall and separated from the upper edge by a vertical screen for retaining fish in said tank while letting water pass,
   a pair of weirs spaced apart from each other on said receptacle's bottom wall,
   an effluent discharge opening in between said weirs,
   solids removal means near each said weir on the opposite side thereof from said discharge opening,
   tangential inlet means through the lower end of said cylindrical wall close to the outer periphery of the inverted conical bottom wall, so that water inflow sends up a rising helical flow, and
   means for sending well-oxygenated substantially non-nitrogenated water into said tangential inlet means.

4. The fish culture tank of claim 3 wherein said tangential inlet means is a single opening through said side wall.

5. The tank of claim 3 wherein said screened drain opening comprises a screen covering said drain opening hinged near one side thereof, and means connected opposite said hinge for swinging said screen up on its hinge for removal through the bottom of solids larger than the screen openings.

6. The fish culture tank of claim 3 having
   filter means connected to said discharge opening for receiving and purifying the water received therefrom,
   pumping means having an inlet for the purified water from said filter means and an outlet leading to said tangential inlet means via a return stream,
   a makeup water conduit means connected to the inlet of said pumping means for keeping the total volume of water in said tank at a desired amount,
   heating means in said makeup water conduit means for raising the temperature of said makeup water to a desired level, and
   said return stream having a mainstream and a pressurized sidestream having means for supplying pure oxygen under pressure thereto for oxygenating the water in said sidestream, so that the water supplied to said tangential inlet means is oxygenated as well as temperature adjusted.

7. The tank of claim 8 having airlift means connected to the drain conduit for carrying the liquid and solids from said drain opening up above the upper end of the tank, a receiving container with a closed bottom into which the airlift means empties, a sloping mesh slide inclined from an upper end of said receiving container down to said upper edge of said tank, for passing through liquid and small size solids and for catching large solids and for enabling live fish to reenter the tank, and drain means beneath said sloping mesh slide for the water and solids passing through said sloping mesh slide.

8. A fish culture tank having self-cleaning properties, including in combination:

an interiorly unobstructed tank having a cylindrical side wall with an upper edge and its height greater than its diameter, an inverted obtusely conical, bottom wall with a screen-covered central drain opening therethrough, a drain conduit leading away from said drain opening, valve means for opening and closing said drain conduit, an overflow collection and removal ring surrounding the upper end of the cylindrical wall, said upper edge having thereon a cylindrical screen for passing water and some solids therethrough but retaining fish in said tank, a pair of weirs in and across said ring close to each other but spaced somewhat apart, a discharge opening in said ring located in between said weirs, solids removal means in said ring near each weir on the opposite side thereof from said discharge opening, a single tangential inlet opening through the lower end of said cylindrical wall close to the outer periphery of the inverted conical bottom wall, so that water inflow sends up a rising helical flow, and means for sending well-oxygenated substantially non-nitrogenated water into said tangential inlet opening.

9. The tank of claim 8 wherein said screen is hinged at one side and a rope is connected to its other side, extending up to the upper edge of said side wall and secured there, for swinging said screen upwardly about its hinge for removal through the bottom of solids larger than the screen openings.

10. The tank of claim 8 having an airlift conduit connected to the drain conduit and extending vertically up above said upper edge, means for supplying air to said airlift conduit for carrying the liquid and solids from said drain conduit up above the upper end of the tank, a receiving container with a closed bottom into which the airlift means empties, a sloping mesh slide inclined from an upper portion of said receiving container down to said upper edge of said tank, for passing through liquid and small solids and catching large solids and for enabling live fish to reenter the tank, and a holding tank beneath said slide, having a bottom wall with a discharge therefor.

11. The fish culture tank of claim 8 having a filtration system connected to said discharge opening for receiving and purifying the water received therefrom, pumping means for returning the purified water from said filtration means to said tangential inlet opening, via a return stream, means for providing makeup water to said pumping means, in order to keep the total volume of water in said tank at a desired amount, and heating means before said pumping means for raising the temperature of said makeup water to a desired level, said return stream comprising a mainstream and a pressurized sidestream having means for supplying substantially pure oxygen under pressure to the water therein for oxygenating the water therein, said sidestream rejoining said mainstream before they reach said tangential inlet opening.

12. A method of culturing fish comprising:

rearing the fish in an interiorly unobstructed cylindrical tank having a sloping conical bottom, supplying well-oxygenated water continuously to said tank tangentially near the bottom and causing the water inflow to rise in a generally helical path toward the top of the tank and then to pass out by continuous screened overflow, continuously purifying the water removed by overflow, continuously adding heated makeup water to the purified water to make up for water losses and to retain the water in said tank at a desired temperature, continuously oxygenating the purified water before supplying it again to said tank, then recirculating it to said supplying step, and periodically cleaning the tank by draining a bottom portion from the conical bottom of the tank through a screen to remove settled solids, said step of periodically cleaning on some occasions including removing the screen from the drain, lifting the drained water to the top of the tank, and screening it there while enabling entrained live fish to reenter said tank.

* * * * *

UNITED STATES PATENT AND TRADEMARK OFFICE
CERTIFICATE OF CORRECTION

PATENT NO. : 4,141,318

DATED : February 27, 1979

INVENTOR(S) : Thomas S. MacVane, Jon M. Lindbergh and Barry A. Friedman

It is certified that error appears in the above-identified patent and that said Letters Patent are hereby corrected as shown below:

Left-hand column of cover page, item [56] References Cited, the issue date of the Finger patent, "8/1974" should read --4/1974--.

Column 9, line 5, which is line 1 of claim 7, "claim 8" should read --claim 3--.

Signed and Sealed this

Fifth Day of June 1979

[SEAL]

Attest:

RUTH C. MASON
Attesting Officer

DONALD W. BANNER
Commissioner of Patents and Trademarks